Aug. 18, 1953 E. DALBY 2,648,915

GRAPHICAL RECORDING AND INDICATING APPARATUS

Filed Aug. 14, 1950

Inventor
Eric Dalby
By Cushman, Darby & Cushman
attorneys

Patented Aug. 18, 1953 2,648,915

UNITED STATES PATENT OFFICE 2,648,915

GRAPHICAL RECORDING AND INDICATING APPARATUS

Eric Dalby, Leeds, England

Application August 14, 1950, Serial No. 179,251
In Great Britain August 19, 1949

3 Claims. (Cl. 35—24)

This invention relates to an improvement in that type of graphical recording and indicating apparatus, well known throughout the literature of business systems, commercial management and statistics as a bar chart, and variously referred to as mechanical bar chart, horizontal bar chart or vertical bar chart. The fundamental requirement in all bar charts being the ability to build-up a continuous bar or line which may extend the entire length or width of the charting area; such bar or line being composed of one or more colours, which may include black and white, or other suitable markings.

It is known that apparatus exists which makes use of tabs, pegs or other detachable markers, for the purpose of building-up the bar or line in various forms of bar chart. Also that continuous tapes, bands, cords or adhesive strips are used for similar purposes. Such methods are either easily liable to accidental misplacement, incapable of giving sufficient variation of colour or other marking in an individual bar or line, or are tedious in operation.

It is also known that rotatable discs, suitably marked and mounted on wires, shafts or axles and with part of the circumference visible through slots, have been used for many years in various indicating devices, such as: revolution counters for machines; scoring devices for games; indicating boards for sub-divided production work, and such like. Invariably, however, in these cases use is made of either single discs or such short lengths of discs that their use is not practicable for bar charts where the essential requirement is the ability to build-up a continuous bar or line across the whole charting area.

The object of the present invention is to provide a new or improved method of construction for a bar chart using the disc method for building-up the bar or line, which is easy to operate and cheap to manufacture.

In considering the economic manufacture of bar charts in which long unbroken rows of discs must operate between long continuous slots stretching across the whole charting surface, previous methods of using short lengths of discs are found to be unsatisfactory for one or more of the following reasons; (*a*) it must be possible to assemble charts of varying dimensions easily, both as to number of bars or lines and as to number of discs per line, thus making it possible to deal with varying charting problems; (*b*) the need for providing support for the long rows of discs without breaking their continuity, thus ensuring perfect alignment behind the slot without sagging; (*c*) the chart must have the minimum total weight thus allowing it to be mounted easily on a wall.

The present invention overcomes these difficulties and comprises a frame in which are fitted long rows of rotatable discs mounted on wires, shafts or axles. Between the rows of discs separators of special section are inserted in such a way that they are in light contact with the discs. The edges of each pair of adjacent separators thus provide a continuous slot through which the colours or other markings on the discs are perfectly aligned. Such construction allows considerable flexibility in manufacturing charts of varying dimensions, whilst the alternate layers of discs and separators provides a compact and efficient unit.

It will be seen that the separators can serve a number of purposes: (*a*) They provide support and prevent sagging of the rows of discs. (*b*) They provide the slot through which the charting line or bar is visible. (*c*) They provide a surface on which can be engraved or printed the charting scale. (*d*) They provide a surface which can be drilled or punched to carry detachable pegs or plugs for coded information relative to the charting bar or line. (*e*) By providing light contact they reduce the possibility of accidental movement of the discs by vibration or other causes. (*f*) They enable speedy methods of manufacture and assembly to be employed.

In order that the nature of the invention and the manner of carrying same out may be more clearly understood, several examples of apparatus according to the invention are illustrated in the accompanying drawing, wherein.

Figures 1, 2, 3, 4, 5, 6, 7:
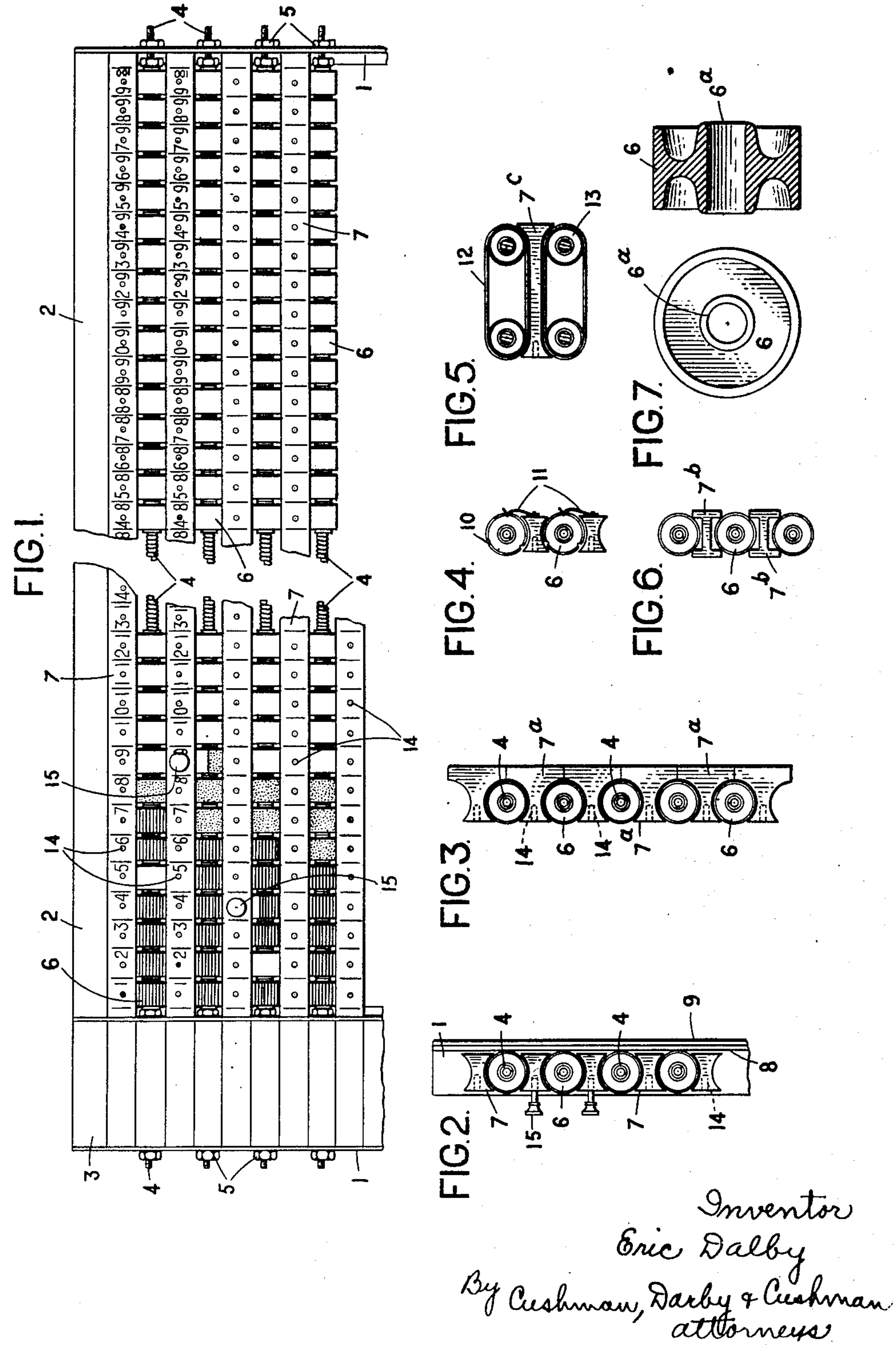
Figure 1 shows a broken front elevation of one construction of apparatus slotted horizontally.
Figure 2 is an end elevation of the apparatus shown in Figure 1, but with the end of the frame and fixing nuts removed.
Figure 3 is a similar view to Figure 2, but showing a different form of bars for producing the slots.
Figure 4 is a detail view showing an arrangement for locking the discs or rings.
Figure 5 is a detail view showing the use of continuous bands instead of discs or rings.
Figure 6 is a similar view to Figure 2 but showing a further alternative form of bars.
Figure 7 shows in side elevation and cross-section to a larger scale one of the discs or rings.

Referring to this drawing the apparatus comprises a frame or board built up from angle strips 1 spaced apart by plain strips 2 with a panel 3 down the left hand side. Mounted horizontally across the frame at spaced intervals is a series of rods or spindles 4 held at their screw threaded ends by nuts 5 by which the rods or spindles can be tensioned. Freely mounted on these rods or spindles 4 are numerous discs or rings 6 forming continuous rows and each row is separated from the next or from the edge of the frame by a bar 7 of special cross-section. These bars 7 may be of metal or other suitable material, but are preferably formed from extruding plastics with curved edges to suit the curvature of the discs or rings 6 (see Figure 2). By this construction the bars 7 are held in place by light contact with the disc 6 and form between them horizontal slots through which a portion of the curved face of each disc is visible and projects slightly.

Each disc 6 as shown in Figure 7 has two central bushes 6*a* which projects slightly to separate one disc from the next and reduce friction between same. These discs may also be made from plastic and are coloured or otherwise marked off into several sections around their peripheries in such manner that when the discs are mounted behind the slots the marking or an individual colour may be seen through the slot and by rotating individual discs on their rods or spindles any desired sequence of markings or colours may be arranged.

The bars 7 are marked off to correspond with the discs and are shown in the drawing as being numbered from 1 to 100 for the purpose of enabling percentages to be recorded and indicated, but any other form of marking could be used depending on the purpose for which the apparatus is required. Each column of discs can have a heading marked on the strip 2 and suitable titling of each row of discs can be entered on the panel 3.

Such titling may be in the form of paper strips held in metal channels or may be in the form of overlapping cards on which could be entered fuller statistical information as in the well-known visible card system.

The shape of the bars 7 may vary and in Figure 3 is shown another form 7*a* in which the bars practically contact each other behind the rows of discs whilst still lightly touching the discs to act as a brake and clamp their movement. In Figure 6 another form of bars 7*b* is shown in which also there is light contact between the bars and the discs.

As an alternative to or in addition to the light contact between the bars and discs to prevent the discs from rotating too freely, a sheet of material as for example, sponge rubber 8 (see Figure 2) may be held in contact with the backs of the discs 6 by a back board 9. Or as shown in Figure 4 each disc 6 may have grooves 10 formed parallel to its axis at equal intervals around its circumference or surface and these grooves will preferably separate the coloured portions or markings of the discs, at the same time providing a means for engaging the discs when it is desired to rotate them individually. A locking strip 11 of flexible nature is associated with each row of discs and is shaped to engage in the grooves 10 to prevent accidental rotation but allow rotation of individual discs when required.

If desired, the locking strips could be non-flexible and be pivoted so as to be capable of operation to positively lock or unlock a whole row of discs.

As shown in Figure 5 instead of using rings or discs 6 the same result may be obtained with continuous bands 12 carried on rollers 13 mounted in similar manner to the discs, the bars 7*c* being shaped accordingly. The bands would be marked off into coloured or other sections and could provide a greater selection of colours or markings than with the discs.

The width of the individual discs, rings or bands may be such that each can be rotated by the operator's fingers, but if desired a tool with rubber or other flexible tip of suitable width could be used.

In case it should be desired to indicate and record fractions or provide greater detail than is shown by the coloured line, each disc has a hole 14 above it provided in the bars 7 to take a peg 15 which may be coloured or marked according to requirement. Two such pegs are shown in use in Figures 1 and 2, the corresponding discs being only partially rotated.

It will be seen that the slotted board could alternatively be formed from a single sheet of metal or other suitable material with the slots stamped out or otherwise produced.

Also, when the shaped bars are used to form the slots they may be fixed on the frame and the discs or rings could then be supported between them without being mounted on shafts or axles.

It is to be understood that where colours are referred to throughout this specification the term may include black and white.

The apparatus would be adapted for mounting on a wall or stand and although its construction renders it unlikely to be altered or disturbed accidentally, it may be provided with a transparent hinged cover or the like adapted to be raised clear for operation of the apparatus and capable of being locked when closed.

Various means for preventing accidental movement of the discs have been mentioned as follows: Light contact between the discs and the material which forms the slot. A clamping device behind each row of discs. A backing-sheet of flexible material such as sponge-rubber in contact with all the discs within the framework of the chart. A transparent cover for the chart which can be secured by a lock. Any one or more of these methods may be used.

I claim:

1. A graphical recording and indicating apparatus of the type known as a bar chart comprising in combination a frame work enclosing the charting area for displaying headings and titles thereon, a series of separators supported across the full extent of said charting area to form a series of continuous parallel slots, a spindle extending across said framework behind each slot, a series of indicator discs rotatably mounted on each spindle and having sets of markings around their circumferences visible through said slots as continuous bars, and a set of markings on each said separator corresponding with any desired number of the adjoining series of discs, said separators being curved along their edges to fit between and be supported solely by the adjoining rows of discs or one such row and the framework, said separators and discs making light contact with one another sufficient to act as a brake on said discs.

2. A graphical recording and indicating apparatus of the type known as a bar chart comprising in combination a framework enclosing the charting area, a series of continuous parallel rows of indicator devices supported within said framework so as to be movable by rotation only about axes parallel to said rows, and a series of continuous separators assembled within said framework and extending fully across the whole charting area parallel to and alternating with said continuous rows of devices to form a series of continuous parallel slots, said separators being of a special section and sufficiently rigid to cooperate with and support the continuous rows of indicator devices along the whole length of said slots, said devices having sets of markings around their peripheries and being capable of rotation to give variable indications visible through the continuous slots formed by said separators and each row of devices being arranged to form a continuous bar of variable markings extending fully across the whole charting area.

3. A bar chart according to claim 2 wherein said continuous separators are so shaped and assembled within said framework as to make light contact with said rotatable indicator devices and hold each one frictionally in any position to which it is rotated so as to show the desired marking.

ERIC DALBY.

References Cited in the file of this patent

UNITED STATES PATENTS

| Number | Name | Date |
|---|---|---|
| 630,855 | Brooks | Aug. 15, 1899 |
| 729,839 | Burrowes | June 2, 1903 |
| 852,758 | Barker | May 7, 1907 |
| 1,019,015 | Barker | Mar. 5, 1912 |
| 1,449,207 | Williams | Mar. 20, 1923 |
| 1,966,695 | Van Schaak | July 17, 1934 |
| 2,500,495 | Mutch | Mar. 14, 1950 |
| 2,503,691 | Sutphin | Apr. 11, 1950 |

FOREIGN PATENTS

| Number | Country | Date |
|---|---|---|
| 317,960 | France | Jan. 21, 1902 |
| 593,130 | Great Britain | Oct. 9, 1947 |